(No Model.)

D. E. DAWSON.
SAWMILL MACHINERY.

No. 545,644. Patented Sept. 3, 1895.

Witnesses.
John Van Hecke
John McGuire

Inventor.
Dennis E. Dawson

UNITED STATES PATENT OFFICE.

DENNIS E. DAWSON, OF MERRILL, ASSIGNOR TO THE EDWARD P. ALLIS COMPANY, OF MILWAUKEE, WISCONSIN.

SAWMILL MACHINERY.

SPECIFICATION forming part of Letters Patent No. 545,644, dated September 3, 1895.

Application filed September 27, 1894. Serial No. 524,278. (No model.)

*To all whom it may concern:*

Be it known that I, DENNIS E. DAWSON, a citizen of the United States, residing at the city of Merrill, in the county of Lincoln and State of Wisconsin, have invented a new and useful Improvement in Sawmill Machinery; and I hereby declare that the following is a full, clear, and exact description of the invention.

In the operation of a sawmill in which a gang-saw is used or in connection with which there is a shingle-mill it is necessary to cut or trim the logs down to certain dimensions by means of a rotary saw before the gang-saw or shingle-saw can be used on them. The logs so cut down and prepared are called "cants." As fast as the slabs and boards are cut from a log in preparing it as aforesaid, they drop onto rollers, by which they are carried away. The cant, when prepared, is dumped from the carriage onto these same rollers, also to be carried away, and, as sawmills are now operated, it is necessary, when the last board has been placed on the rollers in the preparation of each cant, to wait until it has been carried past the cant by the rollers before dumping the cant onto the rollers. By reason of the delay thus occasioned much time is lost.

The object of my invention is to dispense with the aforesaid delay by picking up the board from the rollers the instant it drops onto them and suspending it at a sufficient height above the rollers to permit the cant to be dumped and carried away without delay, after which the board is again lowered to the rollers. I attain this object by the mechanism illustrated in the accompanying drawings, in which—

Figure 1:
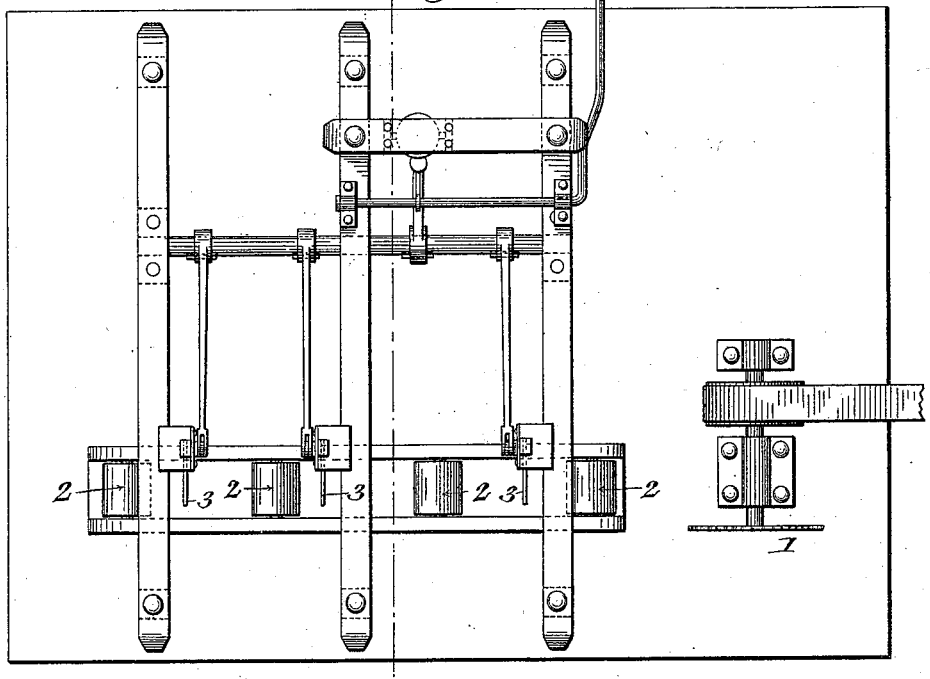
Figure 2:
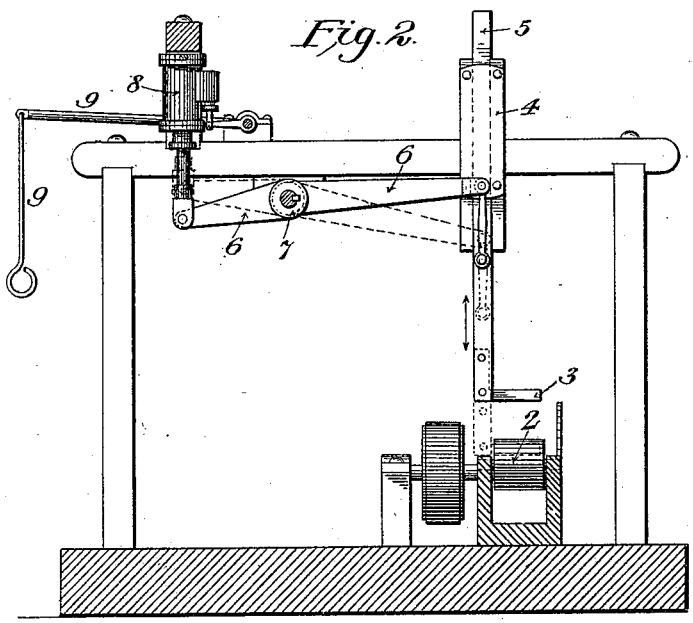

Figure 1 is a view of the rotary saw, the rollers, and that portion of my invention on which the board rests when lifted and suspended, and of their relative positions. Fig. 2 is a view of a section of my invention, showing the manner in which the same is operated, and showing its position when the board is suspended.

In Fig. 1, 1 represents the rotary saw; 2, the rollers on which the lumber and cants are conveyed; 3, that part of my invention on which the board rests when raised from the rollers. 3 is fastened to a sliding bar 5, which is held in position by a framework or box 4, attached to one of the beams overhead. 5 is raised or lowered by means of an arm 6, which works on a rocker-shaft. 7 is operated by a steam-cylinder 8, or by a double friction. 9 is a lever extending from the motive power and hanging down, so as to be convenient for either the sawyer at the rotary saw or the person standing behind the saw, called the "tail-sawyer," to manipulate.

The dotted lines in Fig. 2 show the position of the invention when not in use, the upper surface of 3, when resting on the roller-frame, being below the upper surface of the rollers 2, so as not to interfere with material passing over 2.

The machine or invention is operated as follows: When the last board has been sawed from the cant and dropped onto 2, the carriage carrying the cant stops alongside of 2, the man at the lever 9 pulls down or raises the same accordingly as the motive power is constructed, the rear end of 6 is dropped down, the front of 6 is raised up, also 5 and 3, and the board instantly picked up from 2 and suspended on 3. All this is done without causing any delay whatever. The cant is then dumped onto 2 and carried away while the board is thus suspended and out of the way, after which, by a slight movement of 9, the rear end of 6 is raised and the front end 5 and 3 are lowered so that 3 rests on the roller-frame, and the board is carried away by the rollers.

Of those portions of the invention represented by 3, 4, 5, 6, and 7 combined, there should be three, and more can be successfully operated by the same lever and motive power.

Having thus described my invention, what I claim, and desire to secure by Letters Patent, is—

1. In combination with a lumber transferring or conveying mechanism; devices substantially such as shown and described, adapted to lift one piece of lumber from the conveying mechanism and hold it elevated while the said conveying mechanism transfers or carries away another piece, and then to replace upon the conveying mechanism the piece of lumber lifted; the said lifting device being so arranged relatively to the conveying mechanism, that the path in which the lumber travels is unobstructed by the said lifting device in whichever position to which it may be brought.

2. In a lumber handling plant; the combination with a transferring or conveying mechanism for the cant and slabs; of devices adapted to lift the slab off the conveying mechanism and hold it while the cant is being transferred or carried away by the conveying mechanism, and then replace the slab upon the conveying mechanism, all substantially as shown and described; the said lifting device being so arranged relatively to the conveying mechanism, that the path in which the lumber travels is unobstructed by the said lifting device in whichever position to which it may be brought.

3. In combination with the transferring or conveying rollers; the lifting arms 5, 3, normally inactive; and mechanism whereby said arms are adapted first to raise a piece of lumber off the rollers and hold it while another piece is carried away by the rollers, and then to replace the piece first raised.

DENNIS E. DAWSON.

Witnesses:
JOHN VAN HECKE,
JOHN MCGUIRE.